United States Patent
Sun et al.

(10) Patent No.: US 11,203,239 B2
(45) Date of Patent: Dec. 21, 2021

(54) TRACTION DEVICE AND TRACTION METHOD

(71) Applicant: Nuctech Company Limited, Beijing (CN)

(72) Inventors: Shangmin Sun, Beijing (CN); Hongqi Li, Beijing (CN); Yuan He, Beijing (CN); Quanwei Song, Beijing (CN); Qiangqiang Wang, Beijing (CN); Weifeng Yu, Beijing (CN)

(73) Assignee: Nuctech Company Limited, Beijing (CN)

( * ) Notice: Subject to any disclaimer, the term of this patent is extended or adjusted under 35 U.S.C. 154(b) by 185 days.

(21) Appl. No.: 16/486,654

(22) PCT Filed: Feb. 13, 2018

(86) PCT No.: PCT/CN2018/076698
§ 371 (c)(1),
(2) Date: Aug. 16, 2019

(87) PCT Pub. No.: WO2018/149402
PCT Pub. Date: Aug. 23, 2018

(65) Prior Publication Data
US 2020/0055355 A1    Feb. 20, 2020

(30) Foreign Application Priority Data
Feb. 17, 2017   (CN) .......................... 201710088614.3

(51) Int. Cl.
*B60D 1/24*   (2006.01)
*B60D 1/52*   (2006.01)

(52) U.S. Cl.
CPC   *B60D 1/24* (2013.01); *B60D 1/52* (2013.01)

(58) Field of Classification Search
CPC . B60D 1/24; B60D 1/246; B60D 1/52; B60D 1/55; B60D 1/62; B60D 1/167;
(Continued)

(56) References Cited

U.S. PATENT DOCUMENTS 3,583,728 A * 6/1971 Cornell ................. B60D 1/143
                                                    280/503
3,885,815 A * 5/1975 Kniff ..................... B60D 1/143
                                                    280/402

(Continued)

FOREIGN PATENT DOCUMENTS

| CN | 201745402 U | 2/2011 |
| CN | 202186250 U | 4/2012 |

(Continued)

OTHER PUBLICATIONS

"European Application No. 18754919.1, Extended European Search Report dated Nov. 10, 2020", (dated Nov. 10, 2020), 5 pgs.

(Continued)

*Primary Examiner* — Tony H Winner
(74) *Attorney, Agent, or Firm* — Schwegman Lundberg & Woessner, P.A.

(57) ABSTRACT

The disclosure relates to a traction device and a traction method. The traction device includes: a support chassis; a swing arm, one end of the swing arm is rotatably connected to the support chassis by a rotating shaft such that the swing arm can be switched in a retracted state and a deployed state, wherein the swing arm in the deployed state is adapted to drive the wheel of the vehicle to rotate and tow the vehicle; a driving mechanism, connected to the swing arm, wherein the driving mechanism is capable of driving the swing arm to horizontally rotate around the rotating shaft to switch the swing arm between the retracted state and the deployed state; and a rolling assembly, disposed on a side of the support chassis and being capable of preventing the wheel (Continued)

from contacting with the side of the support chassis when the vehicle is towed.

20 Claims, 10 Drawing Sheets

(58) Field of Classification Search
CPC .... B60D 2001/008; B60P 3/077; B60P 3/125; B60P 3/127
See application file for complete search history.

(56) References Cited

U.S. PATENT DOCUMENTS

| | | | |
|---|---|---|---|
| 4,529,220 A | | 7/1985 | Wright et al. |
| 4,640,523 A | * | 2/1987 | Wolmarans .............. B60D 1/18 280/491.4 |
| 5,133,264 A | * | 7/1992 | Belanger ................. B60S 3/004 104/162 |
| 5,651,319 A | | 7/1997 | Sugahara |
| 6,622,636 B2 | * | 9/2003 | Bonacini ................. B60S 13/00 104/162 |
| 9,636,957 B2 | * | 5/2017 | Duvall ..................... B60D 1/01 |
| 9,802,450 B2 | * | 10/2017 | Mathews ............... B60D 1/145 |
| 2005/0006952 A1 | * | 1/2005 | Kohler .................... B60T 13/74 303/124 |
| 2007/0235985 A1 | * | 10/2007 | Thompson .............. B60P 3/127 280/656 |
| 2008/0159840 A1 | | 7/2008 | Hu et al. |
| 2015/0123378 A1 | | 5/2015 | Tortellier |
| 2018/0242509 A1 | * | 8/2018 | Pennybacker ....... A01B 59/042 |
| 2020/0023694 A1 | * | 1/2020 | Schuettenberg ....... B60D 1/187 |
| 2020/0375082 A1 | * | 12/2020 | Unruh .................. A01B 69/004 |

FOREIGN PATENT DOCUMENTS

| | | |
|---|---|---|
| CN | 104684756 A | 6/2015 |
| CN | 205523483 U | 8/2016 |
| CN | 106965635 A | 7/2017 |
| JP | 2012020815 A | 2/2012 |
| WO | WO-2018149402 A1 | 8/2018 |

OTHER PUBLICATIONS

"International Application No. PCT/CN2018/076698, International Search Report and Written Report dated May 18, 2018", (dated May 18, 2018), 10 pgs.

\* cited by examiner

TRACTION DEVICE AND TRACTION METHOD

CROSS REFERENCE TO RELATED APPLICATION

This application is a U.S. national stage filing under 35 U.S.C. § 371 from International Application No. PCT/CN2018/076698, filed on 13 Feb. 2018, and published as WO2018/149402 on Aug. 23, 2018, which claims priority to Chinese Patent Application No. 201710088614.3, filed on Feb. 17, 2017 and entitled "TRACTION DEVICE AND TRACTION METHOD", the benefit of priority of each of which is claimed herein, and which applications and publication are hereby incorporated by reference in their entirety.

TECHNICAL FIELD

The present disclosure relates to a technical field of traction devices, and specifically relates to a traction device and a traction method.

BACKGROUND

When a vehicle loses power or operational capability, or in the field of vehicle wash, vehicle maintenance and repair, or safety inspection, traction devices are commonly used to pull the vehicle to a predetermined position. At present, the commonly used traction devices generally adopt a rigid traction method (such as a rigid traction rod in a herringbone shape or in a straight shape), or a soft traction method, for example, using a steel wire rope with a hook at one end. These traction devices require manual operation, and the traction device is attached to a front traction member of the vehicle by hand. The process of installing the traction device is complicated, time consuming and laborious.

SUMMARY

On one aspect, the embodiments of the present disclosure discloses a traction device for towing a vehicle, the traction device comprises: a support chassis; a swing arm, wherein one end of the swing arm is rotatably connected to the support chassis by means of a rotating shaft such that the other end of the swing arm can move close to or away from the support chassis, when the other end of the swing arm moves away from the support chassis, the swing arm is in a deployed state, and when the other end of the swing arm moves close to the support chassis, the swing arm is in a retracted state, wherein when in the deployed state, the swing arm is adapted to contact with a circumferential surface of a wheel of the vehicle so as to drive the wheel of the vehicle to rotate and tow the vehicle; a driving mechanism, connected to the swing arm, wherein the driving mechanism is capable of driving the swing arm to horizontally rotate around the rotating shaft so as to switch the swing arm between the retracted state and the deployed state; and a rolling assembly, disposed on a side of the support chassis and being capable of preventing the wheel from contacting with the side of the support chassis when the vehicle is towed.

The traction device according to the embodiments of the present disclosure includes a swing arm being capable of directly driving a wheel. The swing arm is disposed on the support chassis, and can be deployed under the action of the driving mechanism and automatically contact with the wheel, thereby getting into a state where the vehicle is to be towed. There is no need of manual assistance for the coupling operation, and the operation is easy, time-saving and labor-saving. During the rotation and travelling of the wheel, the rolling assembly can prevent the wheel from directly contacting with the supporting chassis, and thus avoid the wheel from being swayed due to the direct contact and friction between the wheel and the supporting chassis, which may result in that the towing work cannot be completed smoothly.

According to a further aspect of the present disclosure, a traction method is disclosed, which comprises steps of: parking the vehicle to be towed to a predetermined area; moving the support chassis into a space below the vehicle; actuating the driving mechanism to adjust the swing arm to the deployed state such that the swing arm contacts with the wheel of the vehicle; dragging the traction device, wherein the swing arm drives the wheel to rotate so as to tow the vehicle to a predetermined position; actuating the driving mechanism to adjust the swing arm to the retracted state; and moving the traction device out of the space below the vehicle and moving the traction device to the predetermined area to tow the next vehicle.

BRIEF DESCRIPTION OF THE DRAWINGS

Features, advantages, and technical effects of the exemplary embodiments of the present disclosure will be described below with reference to the drawings.

In the drawings, the same components are denoted by the same reference numerals. The drawings are not drawn to scale.

DETAILED DESCRIPTION

Implementations of the present disclosure will be further described in detail below with reference to the accompanying drawings and embodiments. The detailed description of the embodiments and the accompanying drawings are intended to exemplarily illustrate the principle of the present disclosure and not to limit the scope of the present disclosure. That is, the present disclosure is not limited to the described embodiments.

In the description of the present disclosure, it should be noted that, unless otherwise stated, the meaning of "several" is one or more; the meaning of "multiple" is two or more;

orientations or positional relationship indicated by the terms "above", "below", "left", "right", "in", "out", "front end", "rear end", "head", "tail", etc., refer to the orientations or positional relationships as shown in the drawings, are used merely for facilitating and simplifying the description of the present disclosure, instead of indicating or implying the device or component referred to must have a particular orientation, be constructed and operated in the particular orientation, and thus shall not be construed as limiting the present disclosure.

Figure 1:
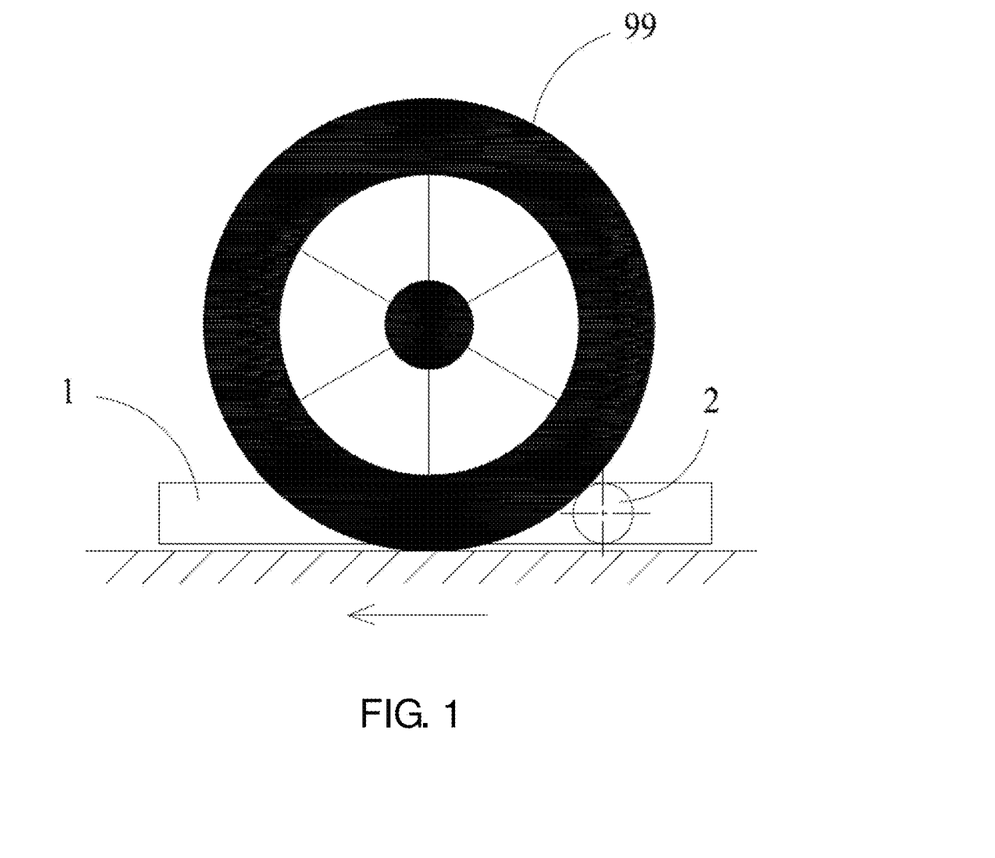
FIG. 1 is a schematic view showing a state in which a traction device drives a wheel according to an embodiment of the present disclosure.

As shown in FIG. 1, a traction device 1 according to an embodiment of the present disclosure is used to tow a vehicle in an unpowered state to move. When towing the vehicle by the traction device 1, the traction device 1 is first placed on the ground below a chassis of the vehicle, and then a swing arm 2 of the traction device 1 is deployed and brought into contact with a circumferential surface of a wheel 99. Then, the traction device 1 is coupled to an external driving device (such as a tractor). The driving device can drive the wheel 99 of the vehicle to roll by means of the swing arm 2 of the traction device 1, so that the entire vehicle can travel on a support surface, such as the ground.

Figure 2:
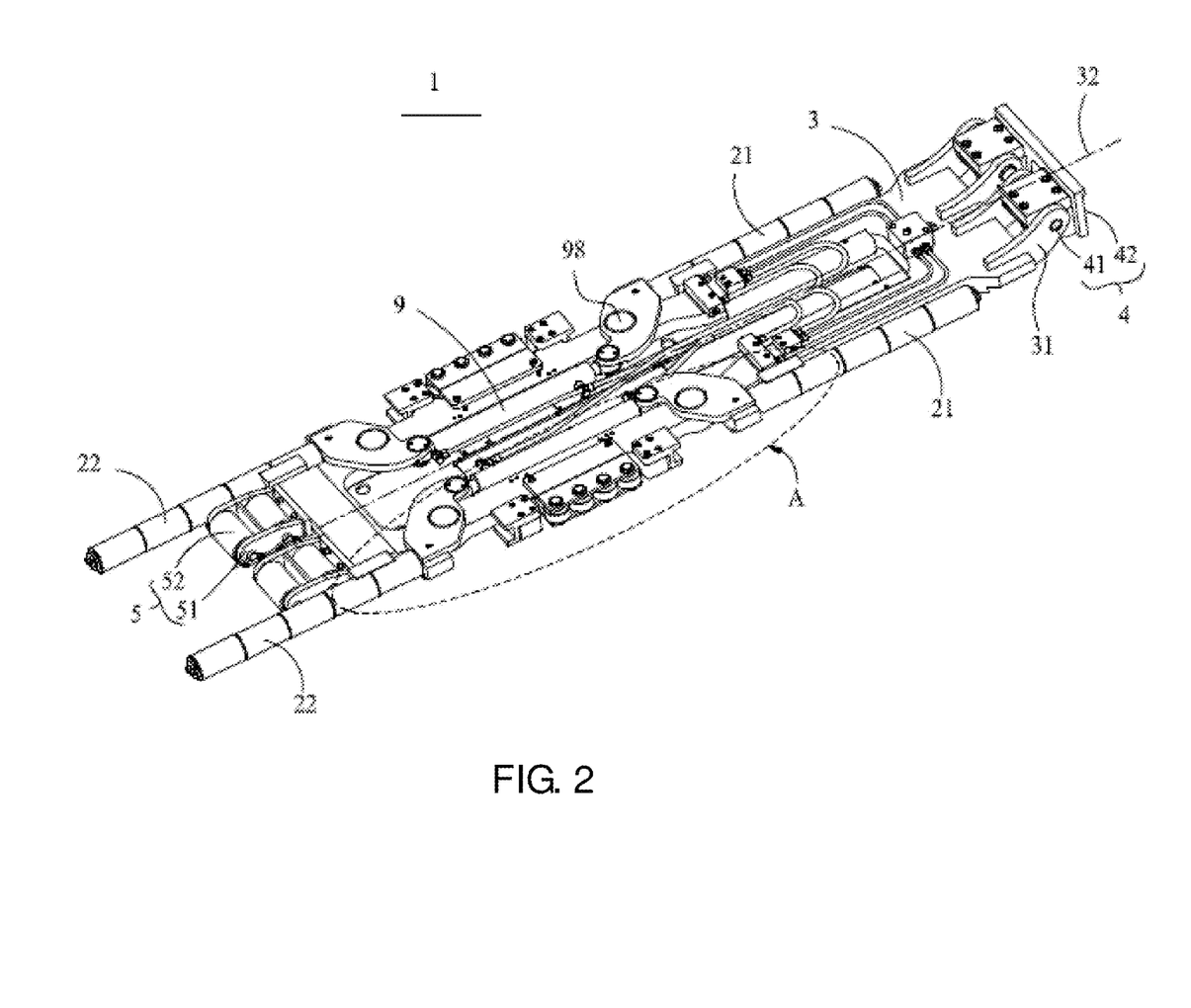
FIG. 2 is a schematic isometric view of a traction device according to an embodiment of the present disclosure.

As shown in FIG. 2, the traction device 1 according to an embodiment of the present disclosure includes a support chassis 3. The support chassis 3 includes a front end, a rear end, and an intermediate portion. The front end of the support chassis 3 is provided with a traction portion 4, and the rear end is provided with a traveling roller assembly 5. The external driving device applies a driving force to the traction device 1 via the traction portion 4. The traveling roller assembly 5 can support the traction device 1 and reduce a movement resistance of the traction device 1, so that the traction device 1 can be dragged to move with a less labor, thereby improving use convenience of the traction device.

The traction portion 4 according to the present embodiment includes a connecting shaft 41 disposed on the support chassis 3 and a traction piece 42 pivotally connected to the connecting shaft 41. The front end of the support chassis 3 is provided with two pairs of support plates 31 extending outward. The support plate 31 is arc-shaped. The two pairs of support plates 31 are disposed symmetrically with respect to a central axis 32 of the support chassis 3. Each of the support plates 31 is provided with one connecting shaft 41. The traction piece 42 includes a connecting portion and two protruding portions disposed side by side on the connecting portion. The connecting portion is used for coupling with the external driving device. The protruding portions are pivotally connected to the connecting shafts 41, such that the traction piece 42 can rotate around the connecting shafts 41 as a whole, thereby facilitating an operator to adjust a position of the connecting portion and couple the connecting portion with the external driving device.

In one embodiment, the front end of the support chassis 3 is provided with three or more pairs of support plates 31. Each pair of support plates 31 is provided with one connecting shaft 41. Alternatively, there is only one connecting shaft 41, and the connecting shaft 41 is inserted into all of the support plates 31, which can increase a rigidity of the traction portion 4, such that the traction device 1 can bear a larger tractive force and thus can drive a vehicle having a greater weight.

The traveling roller assembly 5 according to the present embodiment includes two roller carriers 51 connected to the rear end of the support chassis 3 by means of screws. The two roller carriers 51 are disposed symmetrically with respect to the central axis 32 of the support chassis 3, such that the traction device 1 is balanced in a use state, thereby ensuring a stabilization of a position of the support chassis 3. Each roller carrier 51 is provided with two rollers 52, which can increase the number of fulcrums on the support surface, and thus improve the stabilization of position and load carrying capacity of the entire traction device 1. When the traction device 1 is in use, only outer peripheral surfaces of the rollers 52 are in direct contact with the support surface, which can reduce a frictional resistance between the traction device 1 and the support surface.

In one embodiment, the rear end of the support chassis 3 is provided with only one roller carrier 51, and one roller 52 having a larger diameter is mounted on the roller carrier 51. The rear end of the support chassis 3 may be provided with more than two roller carriers 51, and each roller carrier 51 is provided with one roller 52, or more than two rollers 52.

Figure 5:
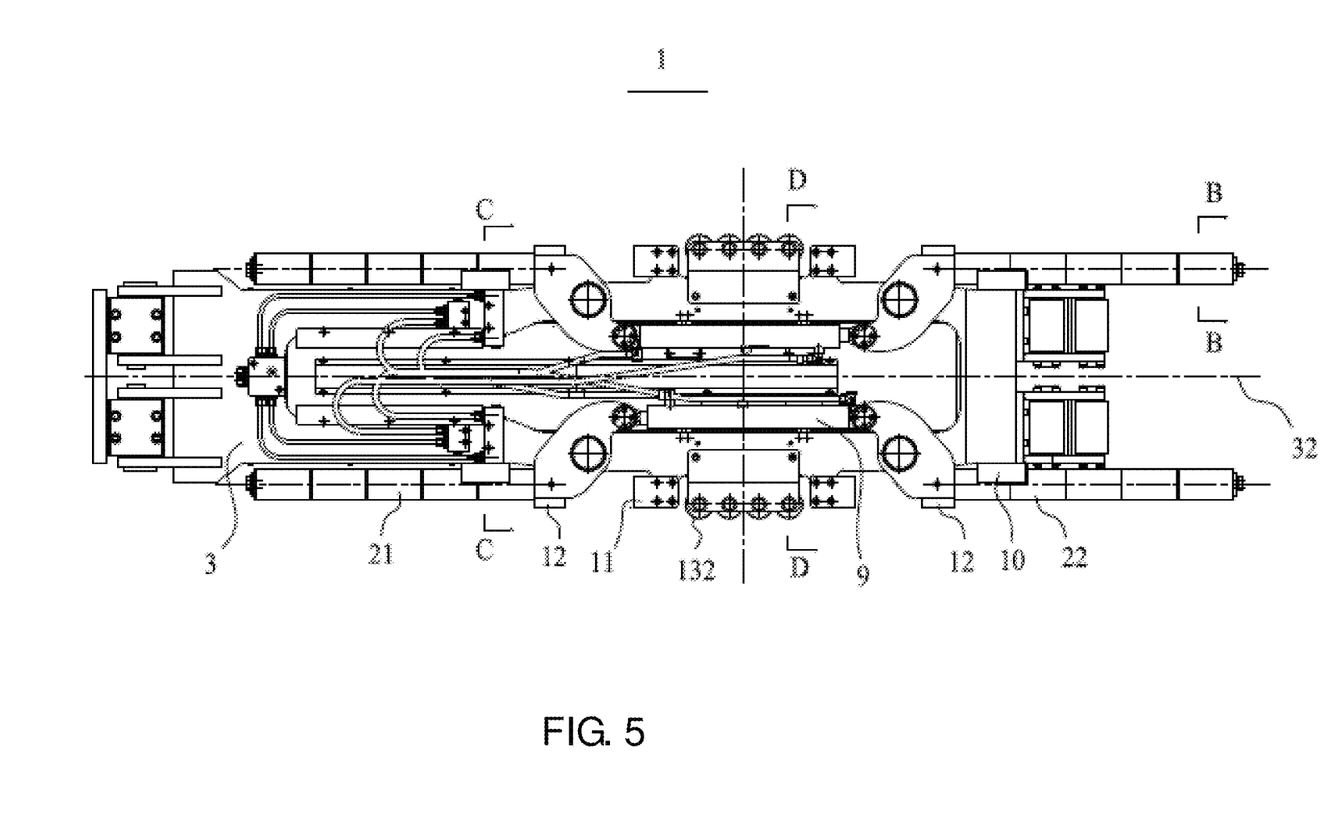
FIG. 5 is a schematic top view of a traction device according to an embodiment of the present disclosure.
Figure 9:
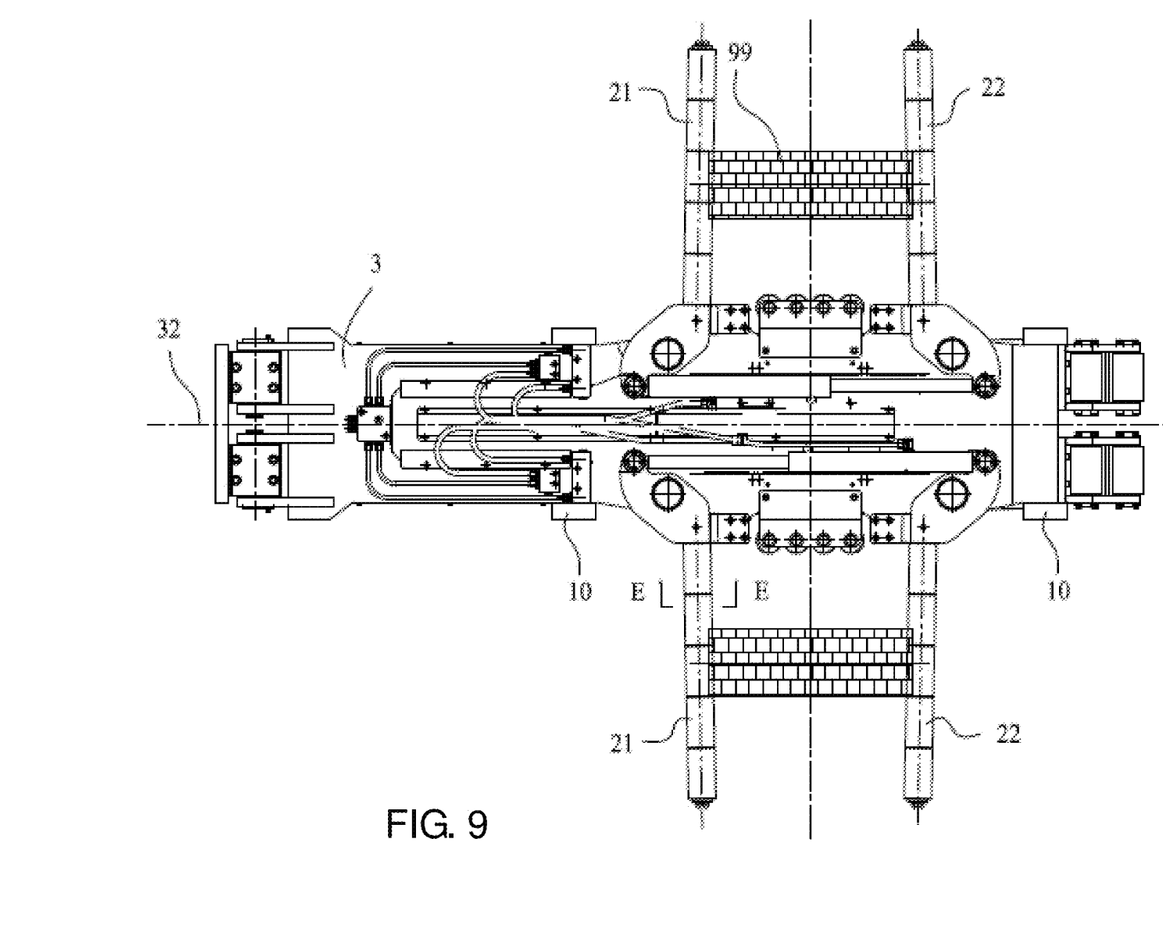
FIG. 9 is a schematic view showing a use state of a traction device according to an embodiment of the present disclosure.

The swing arm 2 of the traction device 1 according to the present embodiment further includes two front swing arms 21 and two rear swing arms 22 disposed at the intermediate portion of the support chassis 3. The two front swing arms 21 are disposed symmetrically with respect to the central axis 32 of the support chassis 3, and the same is true for the two rear swing arms 22. Both of the two front swing arms 21 and the two rear swing arms 22 are connected to the support chassis 3 via respective rotating shafts 98, and each rotating shaft 98 has an axis perpendicular to the support chassis 3. Both of the two front swing arms 21 and the two rear swing arms 22 are rotatable about the respective rotating shafts 98 to rotate horizontally, such that both of the front swing arms 21 and the rear swing arms 22 can be switched between a retracted state (as shown in FIG. 2 or FIG. 5) and a deployed state (as shown in FIG. 9). When the front swing arm 21 or the rear swing arm 22 is switched from the deployed state to the retracted state, the front swing arm 21 or the rear swing arm 22 moves close to the support chassis 3, and conversely, when the front swing arm 21 or the rear swing arm 22 is switched from the retracted state to the deployed state, the front swing arm 21 or the rear swing arm 22 moves away from the support chassis 3. When the front swing arm 21 and the rear swing arm 22 are in the retracted state, axes of the front swing arm 21 and the rear swing arm 22 are both parallel to the central axis 32 of the support chassis 3. When the front swing arm 21 and the rear swing arm 22 are in the deployed state, the axes of the front swing arm 21 and the rear swing arm 22 are both perpendicular to the central axis 32 of the support chassis 3.

When towing the vehicle by using the traction device 1 according to the embodiment of the present disclosure, after the traction device 1 is placed on the support surface below the chassis of the vehicle, the front swing arm 21 and the rear swing arm 22 are operated to transition from the retracted state to the deployed state, thereby holding the wheel 99 of the vehicle therebetween. When the traction device 1 is driven to move, the rear swing arm 22 applies a driving force to the wheel 99 of the vehicle located between the front swing arm 21 and the rear swing arm 22 to rotate the wheel 99, thereby towing the entire vehicle to move forward. The wheel 99 of the vehicle located between the front swing arm 21 and the rear swing arm 22 is restricted by the front swing arm 21 and the rear swing arm 22, and thus, accidental turning of the wheel 99 is less likely to occur, thereby ensuring that the vehicle moves along a predetermined route, and that the towing operation is smoothly completed. When the vehicle being towed is dragged to a predetermined position, the front swing arm 21 can buffer an inertial movement of the vehicle so that the vehicle stops at the predetermined position, and an occurrence of a sliding of the vehicle can be avoided. After the vehicle is stopped completely, the front swing arm 21 and the rear swing arm 22 can be transitioned from the deployed state to the retracted state to release the wheel 99. Finally, the traction device 1 is pulled out from a space below the vehicle, for towing the next vehicle.

Figure 4:
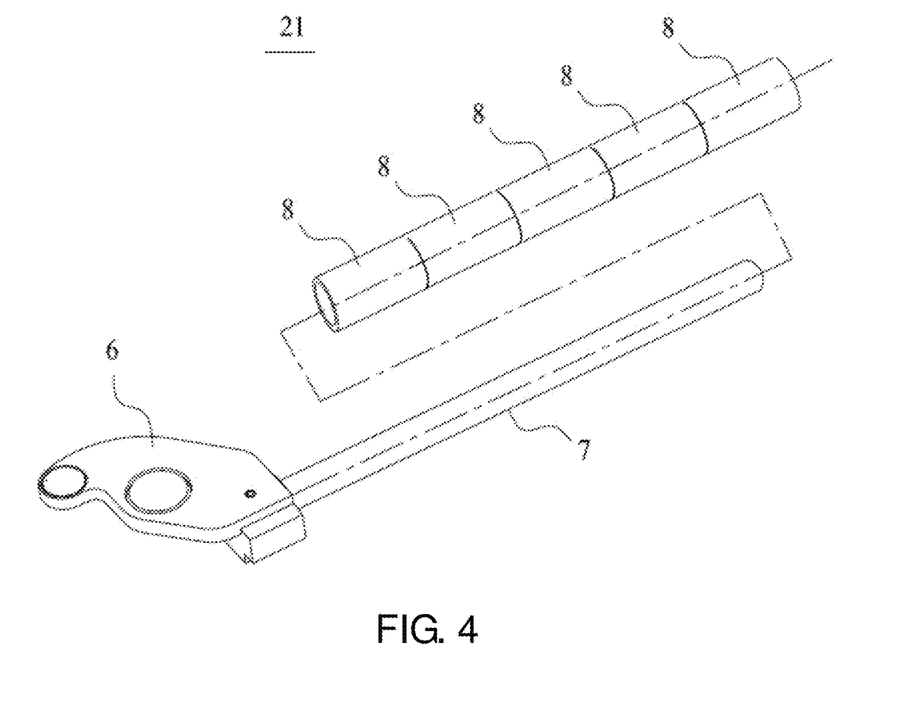
FIG. 4 is a schematic structural view of a front swing arm of a traction device according to an embodiment of the present disclosure.
Figure 6:
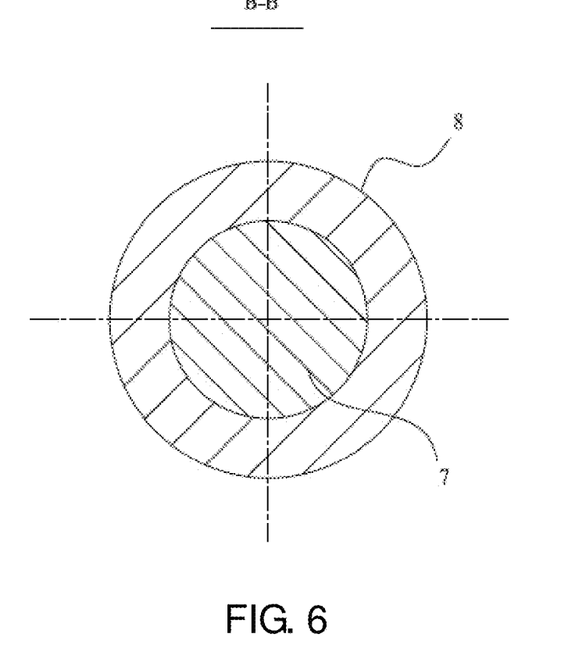
FIG. 6 is a schematic cross-sectional view taken along line B-B of FIG. 5.

The front swing arm 21 has a same configuration as the rear swing arm 22 according to the present embodiment, and thus, merely the configuration of the front swing arm 21 will be described here. As shown in FIGS. 4 and 6, the front swing arm 21 includes a connecting end portion 6 connected to the rotating shaft 98, an arm 7 connected to the connecting end portion 6, and a rotating member 8 sleeved on the arm 7. The connecting end portion 6 is formed in a plate-like shape, and provided with a counterbore. The support chassis 3 is provided with a pin hole. A shaft sleeve is disposed in the pin hole. The rotating shaft 98 is inserted into the counterbore and the shaft sleeve to connect the front swing arm 21 with the support chassis 3. The shaft sleeve can protect the pin hole, to prevent the rotating shaft 98 from directly contacting with the pin hole and thus wearing the pin hole. The arm 7 is formed in a straight rod shape. The rotating member 8 is a bearing or a nylon sleeve. After sleeving at least one bearing or nylon sleeve on the straight rod-shaped arm 7, a screw with a retaining ring is mounted on a free end of the arm 7, and the screw is tightened so that the retaining ring presses against the bearing or the nylon sleeve, thereby preventing the bearing or the nylon sleeve from coming off the arm 7.

Further, when the rear swing arm 22 drives the wheel 99 to rotate, the rotating wheel 99 drives the bearing or the nylon sleeve mounted on the arm 7 of the rear swing arm 22 to rotate, thereby reducing a resistance encountered when the wheel 99 rotates. In the case that a frictional force between the wheel 99 and the arm 7 has a too large component force perpendicular to the support surface, the arm 7 will move perpendicularly to the support surface, bend and deform, even disconnect from the support chassis 3 due to the component force. Therefore, the bearing or the nylon sleeve can prevent the wheel 99 from directly rubbing against the arm 7, thereby protecting the arm 7, avoiding the above-mentioned disadvantages and prolonging a service life of the arm 7.

As shown in FIG. 2, the traction device 1 according to the present embodiment further includes a driving mechanism 9. The driving mechanism 9 of the present embodiment is a hydraulic cylinder. Two ends of the hydraulic cylinder are respectively connected to the connecting end portions 6 of the front swing arm 21 and the rear swing arm 22 by pins. In the case that the front swing arm 21 and the rear swing arm 22 are in the retracted state, the axes of the front swing arm 21 and the rear swing arm 22 are substantially parallel to an axis of the hydraulic cylinder. As such, the hydraulic cylinder can synchronously drive the front swing arm 21 and the rear swing arm 22, and the front swing arm 21 and the rear swing arm 22 can synchronously reach the final deployed state or the retracted state. The hydraulic cylinder is driven by an external hydraulic pumping station to make a telescopic movement, so as to control the deployment and retraction of the front swing arm 21 and the rear swing arm 22. In the case that the front swing arm 21 and the rear swing arm 22 are in the deployed state, the hydraulic cylinder provides a supporting force for the rear swing arm 22 to resist a force applied on the rear swing arm 22 by the wheel 99, and also avoid an accidental retraction of the rear swing arm 22 under a reaction force from the wheel 99.

In one embodiment, the hydraulic cylinders are provided between the connecting end portions 6 of the two front swing arms 21, and between the connecting end portions 6 of the two rear swing arms 22, respectively. The two independent hydraulic cylinders can operate independently, and ensure that the two front swing arms 21 and/or the two rear swing arms 22 can be synchronously deployed or retracted.

The hydraulic cylinder according to the present embodiment is an oil cylinder, and the support chassis 3 is provided with an oil circuit system, to facilitate a supply of oil to the oil cylinder by an external oil pumping station.

In one embodiment, the driving mechanism 9 may be an electric push rod or other telescopic mechanism that can perform the same function.

Figure 7:
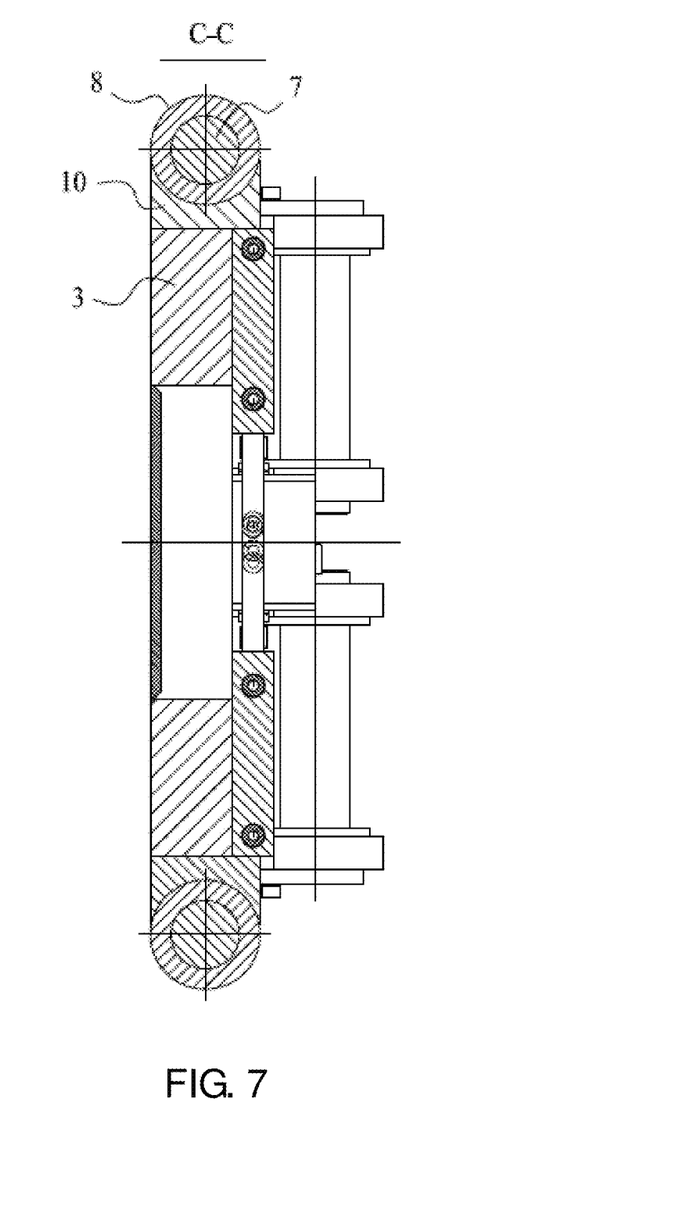
FIG. 7 is a schematic cross-sectional view taken along line C-C of FIG. 5.

As shown in FIG. 5 and FIG. 7, the support chassis 3 according to the present embodiment is provided with retraction limit portions 10 on both sides near the front end and the rear end. In the case that the swing arm 21 and the rear swing arm 22 are in the retracted state, the retraction limit portion 10 is located between the front swing arm 21 and the support chassis 3 or between the rear swing arm 22 and the support chassis 3, to space the front swing arm 21 or the rear swing arm 22 apart from the support chassis 3, and prevent the front swing arm 21 or the rear swing arm 22 from crossing over an optimal retracted position and colliding and rubbing with the support chassis 3, thereby protecting the support chassis 3, the front swing arm 21 and the rear swing arm 22. The retraction limit portion 10 includes a receiving groove configured to match with an outer peripheral surface of the front swing arm 21 or the rear swing arm 22, so as to ensure a larger contact area between the front swing arm 21 or the rear swing arm 22 in the retracted state and the receiving groove, a much better conformation of the front swing arm 21 or the rear swing arm 22 in the retracted state to the receiving groove, and thus a much more stable position of the front swing arm 21 and the rear swing arm 22 in the retracted state. An opening size of the receiving groove of the retraction limit portion 10 is equal to or less than a maximum radial dimension of the front swing arm 21 or the rear swing arm 22. The retraction limit portion 10 may be formed by a projection extending outward from the side of the support chassis 3, or may be a separate member that is mounted and fixedly connected to the side of the support chassis 3. The arms 7 and the rotating members 8 of the front swing arm 21 and the rear swing arm 22 in the present embodiment are both circular in cross section, and the receiving groove has a cross section with an outline of an arc less than or equal to one-half of a circumference.

Figure 3:
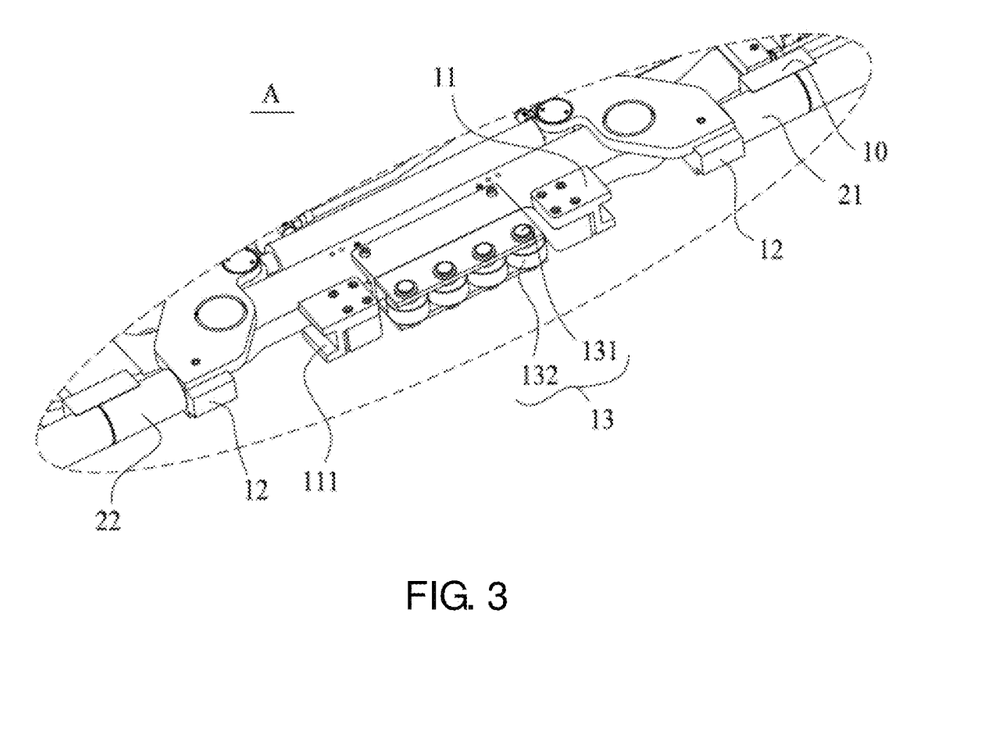
FIG. 3 is a partial enlarged view of a portion A in FIG. 2.

As shown in FIGS. 3 and 5, the support chassis 3 of the present embodiment is provided with a deployment limit portion 11 on the side at the intermediate portion. The deployment limit portion 11 is disposed on a moving path of the front swing arm 21 or the rear swing arm 22. When the first swing arm 21 or the rear swing arm 22 is transitioned from the retracted state to the deployed state and contacts with the deployment limit portion 11, the deployment limit portion 11 can restrict the front swing arm 21 or the rear swing arm 22 from continuing to deploy, such that the front swing arm 21 or the rear swing arm 22 is stopped at a predetermined deployed position, thereby preventing the front swing arm 21 or the rear swing arm 22 from being deployed over the predetermined deployed position. As such, it can be avoided that the wheel 99 of the vehicle cannot be received between the front swing arm 21 and the rear swing arm 22, or that the rear swing arm 22 cannot be perpendicular to the central axis 32 of the support chassis 3 such that a portion of an outer peripheral surface of the rotating member 8 of the rear swing arm 22, disposed opposite to the outer surface of the wheel 99, cannot completely contact with the outer surface of the wheel 99 in an axial direction (that is, a part of the above-mentioned portion contacts with the wheel 99, while the remaining part is separated from the wheel 99 with a gap). When the above-mentioned portion of the outer peripheral surface of the rotating member 8 on the rear swing arm 22 does not completely contact with the outer surface of the wheel 99 in the axial direction, the force applied to the wheel 99 by the rear swing arm 22 may be deviated, and a stress concentration may occur. In the case that the force applied by the rear swing arm 22 to the wheel 99 is deviated, during the rotation of the wheel 99, the wheel 99 will turn and cannot travel in a straight line, which may result in unsmooth towing operation, even a failure of the towing operation. In the case that the force applied to the wheel 99 by the rear swing arm 22 brings the stress concentration on the rotating member 8, the rear swing arm 22 may be bent and deformed, and thus may be damaged. Therefore, the deployment limit portion 11 ensures that the deployment of the rear swing arm 22 is stopped when reaching the predetermined deployment position, where the rear swing arm 22 is perpendicular to the central axis 32 of the support chassis 3, thereby ensuring that the outer peripheral surface of the rotating member 8 completely contacts with the wheel 99, so that the rear swing arm 22 can drive the wheel 99 to travel substantially in a straight line, and that the rear swing arm 22 is evenly balanced to avoid the aforementioned adverse effects.

Figure 10:
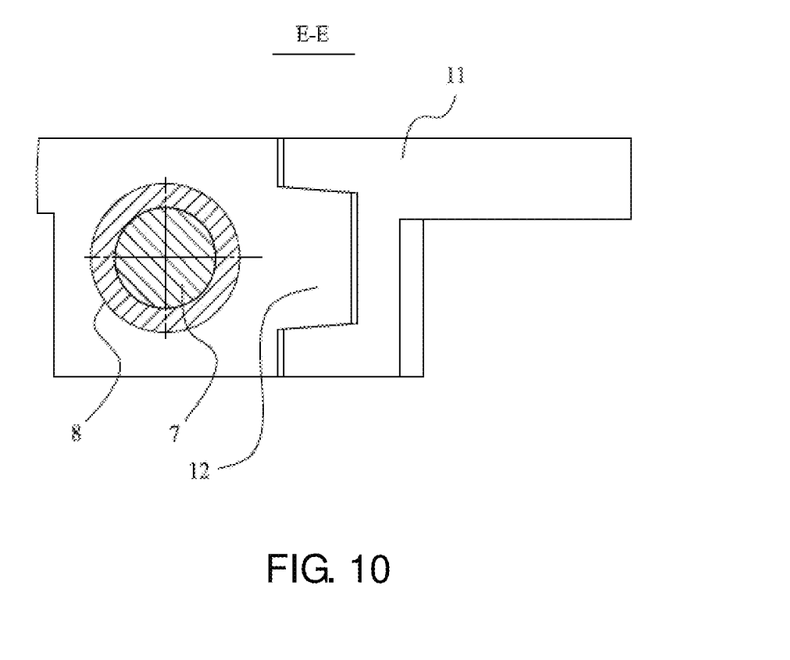
FIG. 10 is a schematic cross-sectional view taken along line E-E in FIG. 9.

As shown in FIGS. 3 and 10, the deployment limit portion 11 of the present embodiment includes a wedge-shaped groove 111, and an axis of the wedge-shaped groove 111 is perpendicular to the central axis 32 of the support chassis 3 and is located in a horizontal plane. The front swing arm 21 or the rear swing arm 22 is provided with a wedge-shaped piece 12. During deployment of the front swing arm 21 or the rear swing arm 22, the wedge-shaped piece 12 on the front swing arm 21 or the rear swing arm 22 gradually engages with the wedge-shaped groove 111 and finally completely conforms to the wedge-shaped groove 111. During the gradual engagement of the wedge-shaped piece 12 with the wedge-shaped groove 111, the wedge-shaped groove 111 can limit a position of the wedge-shaped piece 12, and guide the wedge-shaped piece 12 to engage with the wedge-shaped groove 111. As such, the deployment limit portion 11 can adjust the deployment position of the front swing arm 21 or the rear swing arm 22 by use of the wedge-shaped piece 12, such that the front swing arm 21 or the rear swing arm 22 is located at a horizontal position when in the deployed state. In the case that the front swing arm 21 or the rear swing arm 22 is deformed (for example, the connecting end portion 6 is tilted upward while a free end of the arm 7 droops), the front swing arm 21 or the rear swing arm 22 is not located at the horizontal position. However, by means of the engagement of the wedge-shaped piece 12 with the wedge-shaped grove 111, the front swing arm 21 or the rear swing arm 22 can be eventually adjusted to the horizontal position. Further, the deployment limit portion 11 can support the front swing arm 21 or the rear swing arm 22 in the deployed state, so as to ensure the stabilization of the position of the front swing arm 21 or the rear swing arm 22 in the deployed state.

The deployment limit portion 11 of the present embodiment may be a protruding portion extending outward from the side of the support chassis 3, and a wedge-shaped groove 111 may be provided at a side portion of the protruding portion. Alternatively, the deployment limit portion 11 may be a separate member fixedly connected to the side of the support chassis 3 by screws, and the wedge-shaped groove 111 is provided on the separate member.

Figure 8:
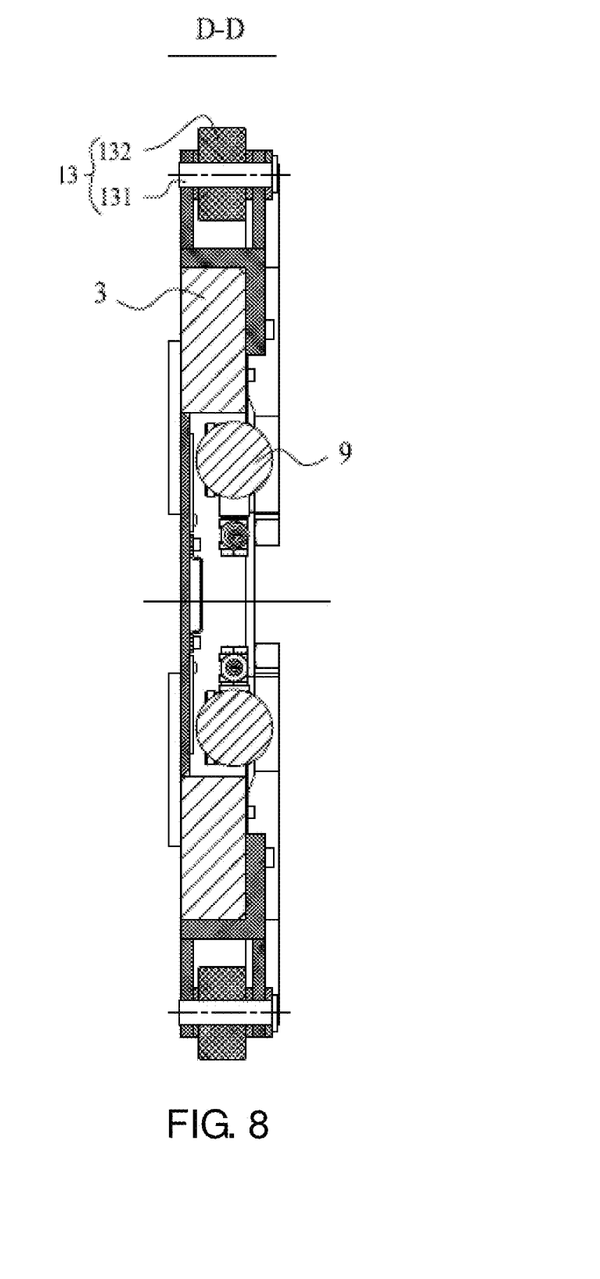
FIG. 8 is a schematic cross-sectional view taken along line D-D of FIG. 5.

As shown in FIGS. 3 and 8, the support chassis 3 of the present embodiment is further provided with a rolling assembly 13 on the side. The rolling assembly 13 is disposed between the deployment limit portion 11 of the front swing arm 21 and the deployment limit portion 11 of the rear swing arm 22. The rolling assembly 13 includes a stationary shaft 131 and a roller 132 pivotally connected to the stationary shaft 131. In the present embodiment, four rollers 132 are provided to increase a coverage area and thus ensure that the rollers 132 can contact with the wheel 99. When the rear swing arm 22 drives the wheel 99 to rotate forward, the wheel 99 may turn occasionally and the turning wheel 99 will come into contact with the roller 132 and drives the roller 132 to rotate. The rotating roller 132 can guide the wheel 99, thereby preventing a direct and hard friction between the wheel 99 and the support chassis 3, ensuring the smooth travelling of the wheel 99, and protecting the side of the support chassis 3 from being damaged.

A width of the support chassis 3 of the present embodiment is smaller than a distance between inner sides of two opposite wheels 99 on left and right sides of the vehicle, so that the support chassis 3 can be smoothly moved into or out of the space below the vehicle. When the front swing arm 21 and the rear swing arm 22 are in the deployed state, a distance between free ends of the two front swing arms 21 or a distance between free ends of the two rear swing arms 22 is greater than or equal to a distance between outer sides of the two opposite wheels 99, thereby ensuring that the front swing arm 21 or the rear swing arm 22 can completely contact with the wheel 99.

The embodiment of the present disclosure further relates to a traction method by using the traction device 1 according to the embodiment of the present disclosure. The method can be performed as follows: at first, parking the vehicle to be towed in a predetermined area; then, pushing the support chassis 3 of the traction device 1 into a space below the chassis of the vehicle to be towed; actuating the driving mechanism 9 to deploy the front swing arm 21 and the rear swing arm 22, such that the wheel 99 is restricted between the front swing arm 21 and the rear swing arm 22; after the front swing arm 21 and the rear swing arm 22 are deployed to the predetermined deployment positions, coupling the traction portion 4 of the traction device 1 to a tractor; starting the tractor to drag the traction device 1, so that the rear swing arm 22 drives the wheel 99 to rotate and thus drive the vehicle to travel, and eventually tow the vehicle to a predetermined position; and after the vehicle arrives at the predetermined position, stopping the tractor, and under the buffering of the front swing arm 21, the vehicle will not continue to travel under the inertia, and thus the vehicle to be towed is accurately parked at the predetermined position.

After the vehicle is stopped completely, the driving mechanism 9 is activated to retract the front swing arm 21 and the rear swing arm 22 to release the wheel 99. After the front swing arm 21 and the rear swing arm 22 are fully returned to the retracted state, the tractor is started to pull the traction device 1 out of the space below the vehicle. Then, the traction device is moved back to the predetermined area to pull the next vehicle.

In one embodiment, it comes first that the vehicle to be towed is parked in a predetermined area, and secondly, the traction portion 4 of the traction device 1 is coupled to the tractor. Then, the tractor drives the traction device 1 and pushes the traction device 1 to the space below the chassis of the vehicle to be towed, and the deployment operation of the front swing arm 21 and the rear swing arm 22 is then performed.

The traction device 1 of the present embodiment drives a front wheel of the vehicle to rotate by the rear swing arm 22 to tow the vehicle. The traction device 1 of the present embodiment can also drive a rear wheel of the vehicle to rotate by the rear swing arm 22. Alternatively, the traction device 1 of the present embodiment can be provided with two sets of front swing arms 21 and two sets of rear swing arms 22, and drives the front wheel and the rear wheel of the vehicle to rotate synchronously. The traction device 1 of the present embodiment can be provided with only the rear swing arm 22, and the wheel 99 also can be driven to rotate so as to tow the vehicle by the rear swing arm 22.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A traction device for towing a vehicle, the traction device comprising:
    a support chassis;
    a swing arm, wherein one end of the swing arm is rotatably connected to the support chassis by means of a rotating shaft such that the other end of the swing arm can move close to or away from the support chassis, when the other end of the swing arm moves away from the support chassis, the swing arm is in a deployed state, and when the other end of the swing arm moves close to the support chassis, the swing arm is in a retracted state, wherein when in the deployed state, the swing arm is adapted to contact with a circumferential surface of a wheel of the vehicle so as to drive the wheel of the vehicle to rotate and tow the vehicle;
    a driving mechanism, connected to the swing arm, wherein the driving mechanism is capable of driving the swing arm to horizontally rotate around the rotating shaft so as to switch the swing arm between the retracted state and the deployed state; and
    a rolling assembly, disposed on a side of the support chassis and being capable of preventing the wheel from contacting with the side of the support chassis when the vehicle is towed,
    wherein the side of the support chassis is provided with a deployment limit portion, and the deployment limit portion is disposed on a moving path of the swing arm for defining a position of the swing arm in the deployed state.

2. The traction device according to claim 1, wherein the rolling assembly comprises a stationary shaft disposed on the support chassis and a roller pivotally connected to the stationary shaft.

3. The traction device according to claim 1, wherein the swing arm comprises a front swing arm and a rear swing arm, wherein the wheel of the vehicle to be towed is located between the front swing arm and the rear swing arm in the deployed state, and the rear swing arm is adapted to drive the wheel of the vehicle to rotate.

4. The traction device according to claim 3, wherein the driving mechanism is adapted to drive the front swing arm and the rear swing arm to rotate in one of the following manners:
    driving the front swing arm and the rear swing arm to rotate synchronously; and
    driving the front swing arm or the rear swing arm to rotate independently.

5. The traction device according to claim 1, wherein the driving mechanism is a telescopic mechanism for driving the swing arm to horizontally rotate by its own telescopic movement.

6. The traction device according to claim 5, wherein the telescopic mechanism is a hydraulic cylinder or an electric push rod.

7. The traction device according to claim 1, wherein the side of the support chassis is provided with a retraction limit portion, and when the swing arm is in the retracted state, the retraction limit portion is located between the swing arm and the support chassis to space the swing arm and the support chassis apart from each other.

8. The traction device according to claim 7, wherein the retraction limit portion comprises a receiving groove for matching with an outer surface contour of the swing arm.

9. The traction device according to claim 1, wherein the deployment limit portion comprises a wedge-shaped groove, and the swing arm is provided with a wedge-shaped piece for matching with the wedge-shaped groove.

10. The traction device according to claim 1, wherein the swing arm comprises an arm and a rotating member sleeved on the arm in an axial direction of the arm, wherein the rotating member is capable of rotating around an axis of the arm, and the rotating member can be rotated by the rotation of the wheel.

11. The traction device according to claim 10, wherein the rotating member is a bearing or a nylon sleeve.

12. The traction device according to claim 1, wherein a front end of the support chassis is provided with a traction portion.

13. The traction device according to claim 1, wherein a rear end of the support chassis is provided with a travelling roller assembly.

14. A traction method by use of the traction device, wherein the traction device comprises:
    a support chassis;
    a swing arm, wherein one end of the swing arm is rotatably connected to the support chassis by means of a rotating shaft such that the other end of the swing arm can move close to or away from the support chassis, when the other end of the swing arm moves away from the support chassis, the swing arm is in a deployed state, and when the other end of the swing arm moves close to the support chassis, the swing arm is in a retracted state, wherein when in the deployed state, the swing arm is adapted to contact with a circumferential surface of a wheel of the vehicle so as to drive the wheel of the vehicle to rotate and tow the vehicle;
    a driving mechanism, connected to the swing arm, wherein the driving mechanism is capable of driving the swing arm to horizontally rotate around the rotating shaft so as to switch the swing arm between the retracted state and the deployed state; and
    a rolling assembly, disposed on a side of the support chassis and being capable of preventing the wheel from contacting with the side of the support chassis when the vehicle is towed
    wherein the method comprises steps of:

parking the vehicle to be towed to a predetermined area;
moving the support chassis into a space below the vehicle;
actuating the driving mechanism to adjust the swing arm to the deployed state such that the swing arm contacts with the wheel of the vehicle;
dragging the traction device, wherein the swing arm drives the wheel to rotate so as to tow the vehicle to a predetermined position;
actuating the driving mechanism to adjust the swing arm to the retracted state;
moving the traction device out of the space below the vehicle and moving the traction device to the predetermined area to tow the next vehicle.

15. The traction method according to claim 14, wherein the rolling assembly comprises a stationary shaft disposed on the support chassis and a roller pivotally connected to the stationary shaft.

16. The traction method according to claim 14, wherein the swing arm comprises a front swing arm and a rear swing arm, wherein the wheel of the vehicle to be towed is located between the front swing arm and the rear swing arm in the deployed state, and the rear swing arm is adapted to drive the wheel of the vehicle to rotate.

17. The traction method according to claim 16, wherein the driving mechanism is adapted to drive the front swing arm and the rear swing arm to rotate in one of the following manners:
driving the front swing arm and the rear swing arm to rotate synchronously; and
driving the front swing arm or the rear swing arm to rotate independently.

18. The traction method according to claim 14, wherein the driving mechanism is a telescopic mechanism for driving the swing arm to horizontally rotate by its own telescopic movement.

19. The traction method according to claim 14, wherein the side of the support chassis is provided with a retraction limit portion, and when the swing arm is in the retracted state, the retraction limit portion is located between the swing arm and the support chassis to space the swing arm and the support chassis apart from each other.

20. A traction device for towing a vehicle, the traction device comprising:
a support chassis;
a swing arm, wherein one end of the swing arm is rotatably connected to the support chassis by means of a rotating shaft such that the other end of the swing arm can move close to or away from the support chassis, when the other end of the swing arm moves away from the support chassis, the swing arm is in a deployed state, and when the other end of the swing arm moves close to the support chassis, the swing arm is in a retracted state, wherein when in the deployed state, the swing arm is adapted to contact with a circumferential surface of a wheel of the vehicle so as to drive the wheel of the vehicle to rotate and tow the vehicle;
a driving mechanism, connected to the swing arm, wherein the driving mechanism is capable of driving the swing arm to horizontally rotate around the rotating shaft so as to switch the swing arm between the retracted state and the deployed state; and
a rolling assembly, disposed on a side of the support chassis and being capable of preventing the wheel from contacting with the side of the support chassis when the vehicle is towed,
wherein the side of the support chassis is provided with a retraction limit portion, and when the swing arm is in the retracted state, the retraction limit portion is located between the swing arm and the support chassis to space the swing arm and the support chassis apart from each other,
wherein the retraction limit portion comprises a receiving groove for matching with an outer surface contour of the swing arm.

* * * * *